US012634167B2

(12) United States Patent
Park

(10) Patent No.: US 12,634,167 B2
(45) Date of Patent: May 19, 2026

(54) EDGE PLATFORM MANAGEMENT DEVICE, OPERATING METHOD OF EDGE PLATFORM MANAGEMENT DEVICE, AND EDGE GATEWAY DEVICE

(71) Applicant: SK TELECOM CO., LTD., Seoul (KR)

(72) Inventor: Min Cheol Park, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 183 days.

(21) Appl. No.: 18/560,702

(22) PCT Filed: Jul. 4, 2022

(86) PCT No.: PCT/KR2022/009602
§ 371 (c)(1),
(2) Date: May 20, 2024

(87) PCT Pub. No.: WO2023/008759
PCT Pub. Date: Feb. 2, 2023

(65) Prior Publication Data
US 2025/0007752 A1     Jan. 2, 2025

(30) Foreign Application Priority Data
Jul. 27, 2021     (KR) ........................ 10-2021-0098674

(51) Int. Cl.
*H04L 12/46* (2006.01)
*H04L 12/66* (2006.01)
*H04L 61/5007* (2022.01)

(52) U.S. Cl.
CPC .......... *H04L 12/4641* (2013.01); *H04L 12/66* (2013.01); *H04L 61/5007* (2022.05)

(58) Field of Classification Search
CPC . H04L 12/4641; H04L 12/66; H04L 61/5007; H04L 45/586; H04L 49/354;
(Continued)

(56) References Cited
U.S. PATENT DOCUMENTS 11,909,637 B2 * 2/2024 Kale ...................... H04L 12/66
2008/0225875 A1 9/2008 Wray et al.
(Continued)

FOREIGN PATENT DOCUMENTS

KR     10-2017-0129461     11/2017
KR     10-2021-0064986     6/2021

OTHER PUBLICATIONS

International Search Report dated Oct. 5, 2022 issued in Application No. PCT/KR2022/009602.
(Continued)

*Primary Examiner* — Brian J. Gillis
*Assistant Examiner* — Juan C Turriate Gastulo
(74) *Attorney, Agent, or Firm* — KED & ASSOCIATES, LLP

(57) ABSTRACT
The present disclosure relates to an edge platform management device, an operation method of edge platform management device, and an edge gateway device which may efficiently support multi-tenancy within an edge platform required in a mobile-edge computing (MEC) environment.

8 Claims, 9 Drawing Sheets

(58) Field of Classification Search
CPC ..... H04L 12/46; H04L 45/74; H04L 61/2503;
H04L 61/2514; G06F 9/455; G06F
9/45558; G06F 2009/45595
See application file for complete search history.

(56) References Cited

U.S. PATENT DOCUMENTS

| | | | | |
|---|---|---|---|---|
| 2011/0119748 | A1 | 5/2011 | Edwards et al. | |
| 2014/0201733 | A1* | 7/2014 | Benny ................. | G06F 9/45558 |
| | | | | 718/1 |
| 2015/0249573 | A1 | 9/2015 | Miller et al. | |
| 2019/0116061 | A1* | 4/2019 | Park ..................... | H04L 49/354 |
| 2019/0245782 | A1* | 8/2019 | Jin ........................ | H04L 49/252 |
| 2021/0051077 | A1* | 2/2021 | Dempo .............. | G06F 9/45558 |

OTHER PUBLICATIONS

Korean Office Action dated Mar. 23, 2023 issued in Application No.
10-2021-0098674.
Korean Notice of Allowance dated Aug. 31, 2023 issued in Application No. 10-2021-0098674.

\* cited by examiner

<Edge platform management device>

EDGE PLATFORM MANAGEMENT DEVICE, OPERATING METHOD OF EDGE PLATFORM MANAGEMENT DEVICE, AND EDGE GATEWAY DEVICE

CROSS-REFERENCE TO RELATED PATENT APPLICATIONS

This application is a U.S. National Stage Application under 35 U.S.C. § 371 of PCT Application No. PCT/KR2022/009602, filed Jul. 4, 2022, which claims priority to Korean Patent Application No. 10-2021-0098674, filed Jul. 27, 2021, whose entire disclosures are hereby incorporated by reference.

TECHNICAL FIELD

The present disclosure relates to a method to support multi-tenancy in a mobile-edge computing (MEC) environment.

The present application claims the benefit of priority to Korean Patent Application No. 10-2021-0098674 filed on Jul. 27, 2021, in the Korean Intellectual Property Office, the entire disclosure of which is incorporated herein by reference.

BACKGROUND ART

Server-less computing is a form of service in which all elements except an application are provided by a cloud provider. In the server-less computing service, except for applications, physical infrastructure, virtual machines, containers, and integrated management areas are serviced by cloud providers, and users can manage applications.

Among the components described above, the container is a virtualization technique much lighter than a virtual machine (VM) and may configure and operate all elements related to application execution in one package.

The container may have a capacity relatively smaller than that of the virtual machine, which may reduce the time required for developers to produce and distribute the container, and has the advantage of being able to restart quickly.

In a mobile-edge computing (MEC) environment, which is to provide various IT services and technologies having been provided in a conventional cloud environment at an edge of mobile networks, support for the aforementioned virtual resources including the container is also required.

In this regard, most of the current services are implemented by a microservice architecture based on Kubernetes, which is an open-source system that automatically distributes, scales, and manages a containerized application.

Accordingly, support for Kubernetes is essential in the above-described mobile edge computing environment as well.

Specifically, another requirement in the mobile-edge computing environment is multi-tenancy in which a single instance provides service to multiple customers.

In consideration of an environment in which independent services for multiple customers are distributed, installed, and managed, each service needs to be separated in terms of network and resources for security and stability.

To this end, the present disclosure suggests an efficient network management method that can support multi-tenancy in a mobile-edge computing environment.

DISCLOSURE OF INVENTION

Technical Problem

The present disclosure has been made in view of the above-mentioned problems, and an aspect of the present disclosure is to suggest an efficient network management method which may support multi-tenancy in a mobile-edge computing (MEC) environment.

Solution to Problem

An aspect of an embodiment of the present disclosure is to provide an edge platform management device including a network generation part configured to interconnect virtual machines through a virtual LAN for generating an internal network in which communication between the virtual machines connected to the virtual LAN is supported; and a network management part configured to interconnect virtual LANs constituting the internal networks through a virtual router to support communication between internal networks connected through the virtual router, thereby extending a communication area of virtual machines.

Specifically, the network management part may be configured to interconnect an external network for supporting a switch (physical switch)-based routing to the virtual router to support Internet connection through the external network and an edge gateway device, thereby extending a communication area of virtual machines.

Specifically, the external network may be generated to have a public IP subnet, and the virtual router may be allocated with a public IP address of public IP band belonging to the external network to process Internet traffic according to connection with the external network.

Specifically, the external network may be configured to, when each virtual machine belonging to the internal network attempts Internet traffic, process the Internet traffic by setting the public IP address allocated to the virtual router as a source IP address and randomly changing a source port, and the edge gateway device may be configured to, when an inbound packet occurs during the Internet traffic processing procedure, transfer the inbound packet to the virtual machine having attempted the Internet traffic according to source information including the source IP address and the source port.

Specifically, the external network may be configured to, when processing for an inbound packet in each virtual machine belonging to the internal network is required, allocate a public IP address of public IP band to the virtual machine as a floating IP address, and the edge gateway device may be configured to, when the inbound packet is received, change the floating IP address set as a destination IP of the inbound packet to a private IP address of the virtual machine according to a mapping relationship between the floating IP address and the private IP address.

According to an aspect of an embodiment of the present disclosure, the edge gateway device is configured to transfer an inbound packet by using an external network connected to a virtual router in relation to an edge platform configuring internal network in which virtual machines are connected through a virtual LAN and connecting virtual LANs of internal networks through the virtual router.

Specifically, the external network may be generated to have a public IP subnet, and the virtual router may be allocated with a public IP address of one of public IP bands belonging to the external network to process Internet traffic according to connection with the external network.

3

Specifically, the external network may be configured to, when each virtual machine belonging to the internal network attempts Internet traffic, process Internet traffic by setting a public IP address allocated to the virtual router as a source IP address and randomly changing a source port, and the edge gateway device may be configured to, when an inbound packet occurs during the Internet traffic processing procedure, transfer the inbound packet to the virtual machine having attempted the Internet traffic according to source information including the source IP address and the source port.

Specifically, the external network may be configured to, when processing for an inbound packet in each virtual machine belonging to the internal networks is required, allocate a public IP address of public IP band to the virtual machine as a floating IP address, and the edge gateway device may be configured to, when the inbound packet is received, change the floating IP address set as a destination IP of the inbound packet to a private IP address of the virtual machine according to mapping relationship between the floating IP address and the private IP address.

An aspect of an embodiment of the present disclosure is to provide an operation method of an edge platform management device including interconnecting virtual machines through a virtual LAN for generating an internal network in which communication between the virtual machines connected to the virtual LAN is supported; and interconnecting virtual LANs constituting internal networks through a virtual router to support communication between internal networks connected through the virtual router, thereby extending a communication area of virtual machines.

Specifically, the connecting virtual LANs may further comprise interconnecting an external network for supporting a switch (physical switch)-based routing to the virtual router to support Internet connection through the external network and an edge gateway device, thereby extending a communication area of virtual machines.

Specifically, the external network may be generated to have a public IP subnet, and the virtual router may be allocated with a public IP address of public IP band belonging to the external network to process Internet traffic according to connection with the external network.

Specifically, the external network may be configured to, when each virtual machine belonging to the internal network attempts Internet traffic, process the Internet traffic by setting the public IP address allocated to the virtual router as a source IP address and randomly changing a source port, and the edge gateway device may be configured to, when an inbound packet occurs during the Internet traffic processing procedure, transfer the inbound packet to the virtual machine having attempted the Internet traffic according to source information including the source IP address and the source port.

Specifically, the external network may be configured to, when processing for an inbound packet in each virtual machine belonging to the internal network is required, allocate a public IP address of public IP band to the virtual machine as a floating IP address, and the edge gateway device may be configured to, when the inbound packet is received, change the floating IP address set as a destination IP of the inbound packet to a private IP address of the virtual machine according to a mapping relationship between the floating IP address and the private IP address.

Advantageous Effects of Invention

The edge platform management device, the operation method of the edge platform management device, and the edge gateway device according to the present disclosure may be configured to define an object with respect to an internal network configured to support communication between virtual machines in a mobile-edge computing environment and extend a communication area of virtual machine included in the internal network on the basis of the object so as to efficiently implement multi-tenancy.

BEST MODE FOR CARRYING OUT THE INVENTION

Hereinafter, a preferred embodiment of the present disclosure will be described with reference to accompanying drawings.

An embodiment of the present disclosure shows a mobile-edge computing technology in which a container, which is a virtual resource, is installed on a virtual machine (VM) to provide customer-specific services based thereon.

The mobile edge computing technology denotes a concept to provide various IT services and technologies to an edge of a mobile network and requires support for the container which is a virtual resource, as in existing cloud environments.

Here, the container is a virtualization technique much lighter than a virtual machine (VM) and may configure and operate all elements related to application execution in one package.

The container may have a capacity relatively smaller than that of the virtual machine, which may reduce the time required for developers to produce and distribute the container, and has the advantage of being able to restart quickly.

Meanwhile, most of the current services are composed of a microservice architecture based on Kubernetes, an open-source system that automatically distributes, scales, and manages a containerized application.

Accordingly, support for Kubernetes is essential in the above-described mobile edge computing environment as well.

Specifically, another requirement in the mobile-edge environment is multi-tenancy in which a single instance provides a service to multiple customers.

In this regard, in consideration of a current service environment in which independent services for multiple customers are distributed, installed, and managed, each service should be separated in terms of network and resources for security and stability.

To this end, an embodiment of the present disclosure suggests a network management method that can efficiently support multi-tenancy within an edge platform in a mobile-edge computing environment.

Figure 1:
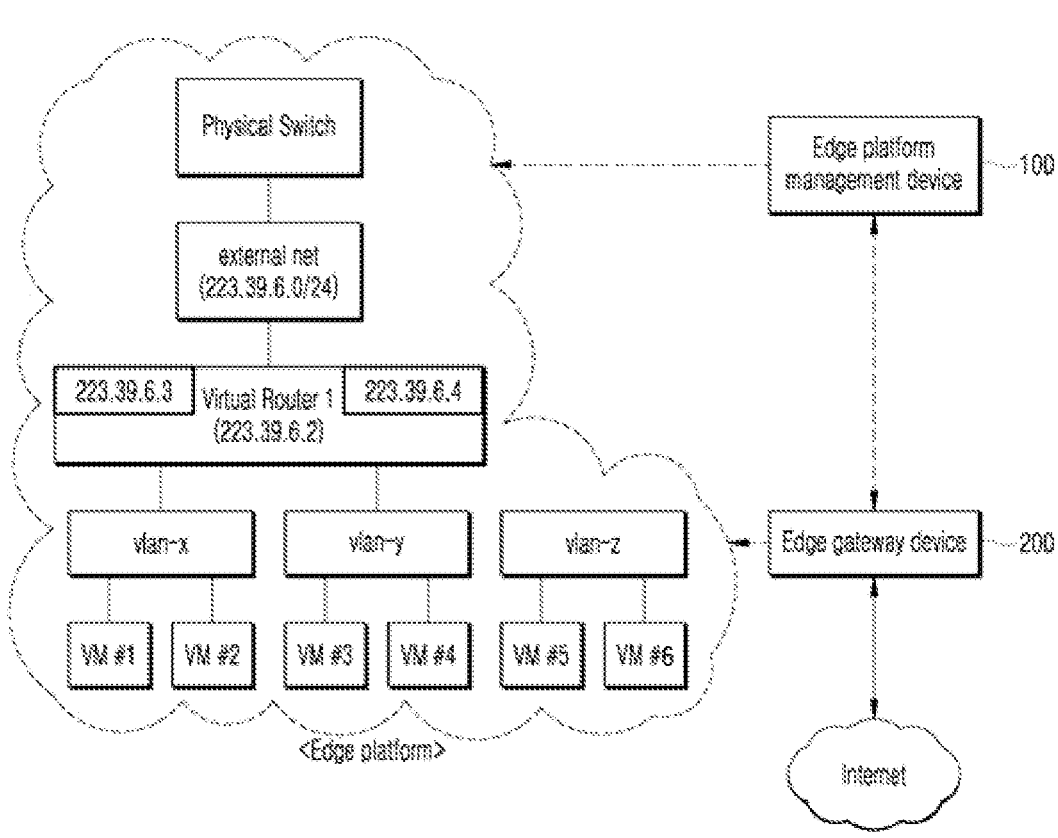
FIG. 1 is an exemplary view illustrating a mobile-edge computing environment according to an embodiment of the present disclosure.

FIG. 1 illustrates a mobile-edge computing environment according to an embodiment of the present disclosure.

As shown in FIG. 1, in the mobile-edge computing environment according to an embodiment of the present disclosure, there may be a configuration including an edge platform management device 100 configured to manage a virtual network configured to have an inter-VM connection structure, and an edge gateway device 200 configured to support Internet packet-processing related to virtual machines.

The edge platform management device 100 denotes a device configured to generate and control a virtual network by using the inter-VM connection structure including PODs.

A software-defined networking controller (SDN controller), for example, may correspond to the edge platform management device 100.

The edge gateway device 200 denotes a traffic-processing gateway node provided to transfer Internet traffic between a virtual network and Internet when Internet connection of a virtual machine is necessary.

The edge gateway device 200 may be configured to have a form configured to run in a server on the basis of software.

The multi-tenancy can be efficiently supported within an edge platform on the basis of the above-described configuration in the mobile-edge computing environment according to an embodiment of the present disclosure. Hereinafter, a configuration of the edge platform management device 100 to implement this will be described in detail.

Figure 2:
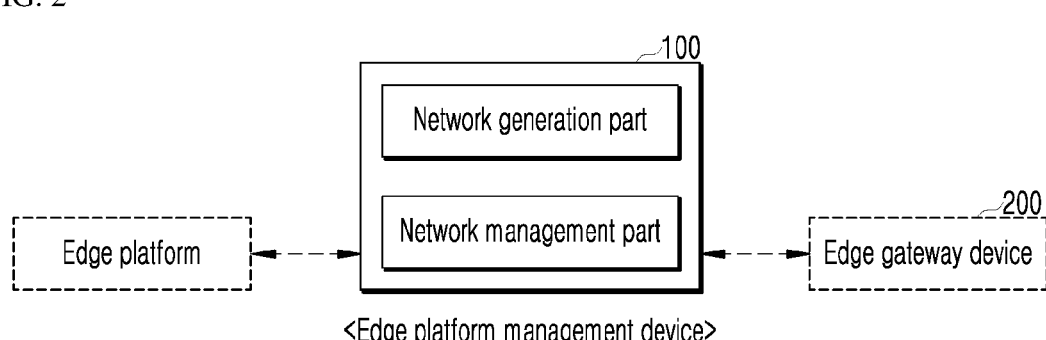
FIG. 2 is a schematic view illustrating an edge platform management device according to an embodiment of the present disclosure.

FIG. 2 illustrates a schematic configuration of the edge platform management device 100 according to an embodiment of the present disclosure.

As shown in FIG. 2, the edge platform management device 100 according to an embodiment of the present disclosure may be configured to include a network generation part 110 configured to generate an internal network to support communication between virtual machines (VMs) and a network management part 120 configured to extend a communication area of virtual machines included in the internal network.

Here, the virtual machine is configured to include a POD in which at least one container is configured to be installed.

The supporting of communication between virtual machines in an embodiment of the present disclosure may be understood as supporting communication between virtual machines with respect PODs.

The entire configuration or a partial configuration of the edge platform configured to include the network generation part 110 and the network management part 120 may be implemented in a hardware module or a software module, or implemented in a form of combining a hardware module and a software module.

The software module may be construed as, for example, an instruction executed by a processor configured to process an operation within the edge platform management device 100, and the instruction may be configured to have a form mounted in a separate memory in the edge platform management device 100.

The edge platform management device 100 according to an embodiment of the present disclosure may be configured to efficiently support multi-tenancy in an edge platform required in the mobile-edge computing environment through the above-described configuration. Hereinafter, each component of the edge platform management device 100 to implement this will be described in more detail.

The network generation part 110 is configured to perform a function of generating an internal network.

More specifically, the network generation part 110 is configured to interconnect virtual machines through a virtual LAN and generate an internal network in which communication between virtual machines connected to the virtual LAN is supported.

Figure 3:
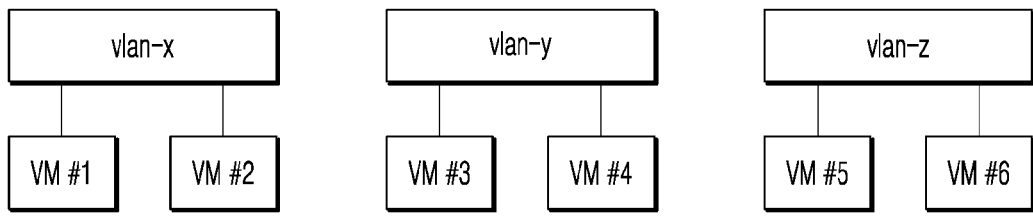
FIG. 3 is an exemplary view illustrating an internal network according to an embodiment of the present disclosure.

For example, as shown in FIG. 3, in case of generating a first virtual machine VM #1 to a sixth virtual machine VM #6, an internal network may be configured to be generated in a manner of generating a first virtual LAN vlan-x, a second virtual LAN vlan-y, and a third virtual LAN vlan-z for a pair of the first virtual machine VM #1 and the second virtual machine VM #2, a pair of the third virtual machine VM #3 and the fourth virtual machine VM #4, and a pair of the fifth virtual machine VM #5 and the sixth virtual machine VM #6, respectively, and using the virtual LANs to interconnect a designated pair of virtual machines.

Here, it is possible to perform communication between the first virtual machine VM #1 and the second virtual machine VM #2 connected through the first virtual LAN vlan-x, communication between the third virtual machine VM #3 and the fourth virtual machine VM #4 connected through the second virtual LAN vlan-y, and communication between the fifth virtual machine VM #5 and the sixth virtual machine VM #6 connected through the first virtual LAN vlan-z.

Meanwhile, communication (VM #1, #2/VM #3, #4/VM #5, #6) between internal networks and Internet connection remain impossible.

The network management part 120 is configured to perform a function of supporting communication between internal networks.

More specifically, when an internal network is generated, the network management part 120 is configured to interconnect, through a virtual router, virtual LANs constituting the internal network and extend a communication area of virtual machines so that communication between internal networks connected through the virtual router is supported.

Figure 4:
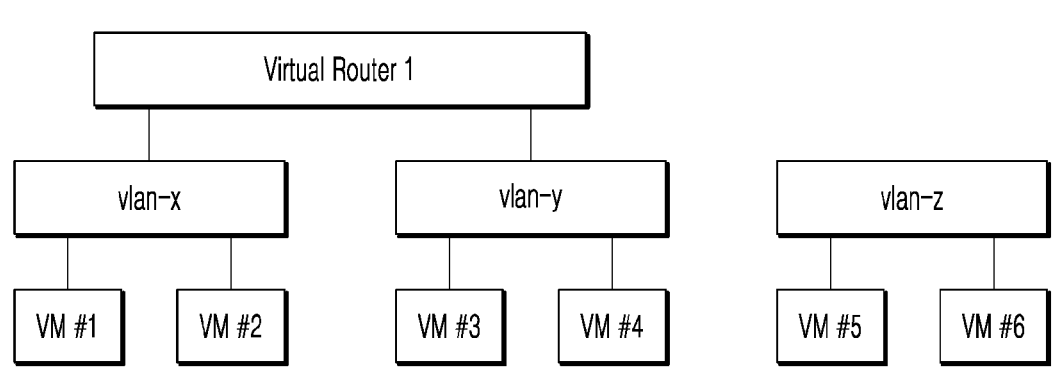
FIGS. 4 and 5 are exemplary views illustrating communication area extension for virtual machines according to an embodiment of the present disclosure.

For example, as shown in FIG. 4, in case that supporting for communication between the internal network including the first virtual LAN vlan-x and the internal network including the second virtual LAN vlan-y is required, a communication area of virtual machines VM #1, #2, #3, and #4 may be configured to be extended to support communication between internal networks connected through the virtual router Virtual Router 1 by connecting the first virtual LAN vlan-x and the second virtual LAN vlan-y through the virtual router Virtual Router 1.

In this case, communication between the first virtual machine VM #1 and the third virtual machine VM #3 or the fourth virtual machine VM #4, and communication between the second virtual machine VM #2 and the third virtual machine VM #3 or the fourth virtual machine VM #4 become possible.

Meanwhile, since the third virtual LAN vlan-z is not connected to the virtual router Virtual Router 1, in case of the fifth virtual machine VM #5 and the sixth virtual machine VM #6, it may be seen that communication with other internal networks remains impossible.

The network management part 120 is configured to perform a function of supporting Internet connection.

More specifically, when support for communication between internal networks is completed, the network management part 120 is configured to connect an external network configured to support switch (physical switch)-based routing to a virtual router to extend a communication area of virtual machines so that Internet connection is configured to be supported through connection of the external network and the edge gateway device 200.

Here, the network management part 120 is configured to generate the external network to have a public IP subnet and the virtual router connected to the external network may be allocated with a public IP address of one of public IP bands belonging to the external network to process Internet traffic.

Figure 5:
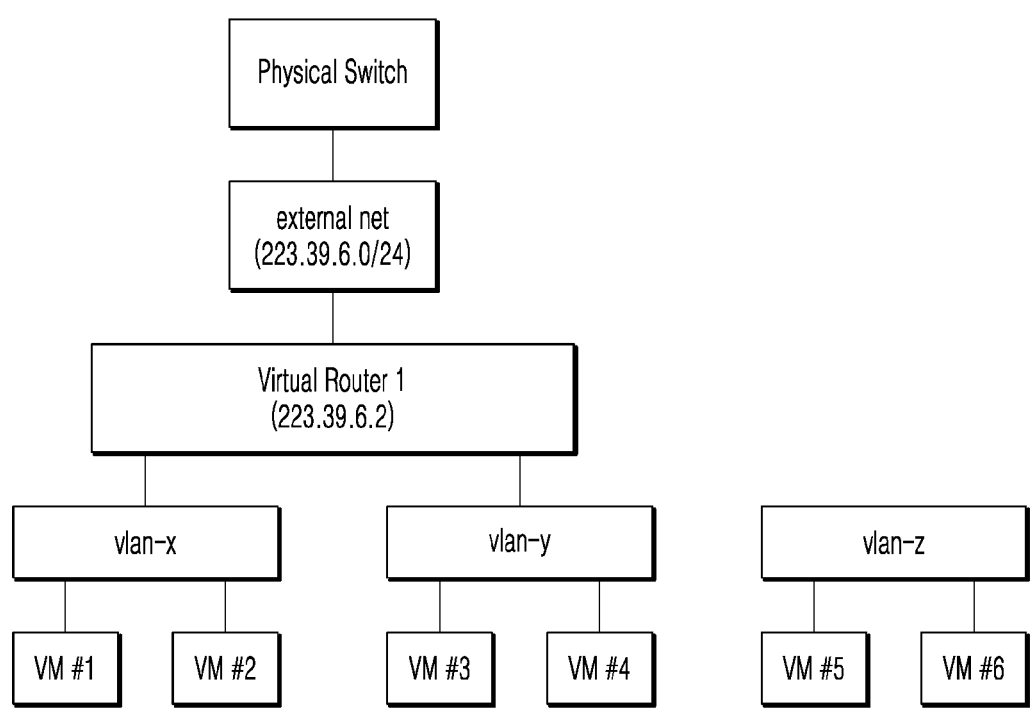

For example, as shown in FIG. 5, in case that the external network (external net) has a public IP band of 223.39.6.0/24, it is possible that the virtual router Virtual Router 1 connected to the external network (external net) is allocated with 223.39.6.2, which is one of public IP bands belonging to the external network (external net).

As such, the public IP address allocated to the virtual router when connected to the external network is to be used for Stateful NAT.

In this regard, when attempting Internet traffic in each virtual machine belonging to the internal network, the external network according to an embodiment of the present disclosure is configured to process Internet traffic by configuring the public IP address allocated to the virtual router as a source IP address and randomly changing a source port.

In response, with reference to the source information, the edge gateway device 200 is configured to transfer an inbound packet generated during the Internet traffic processing procedure to the same virtual machine having attempted the Internet traffic.

Referring to above-described FIG. 5 again, when attempting Internet traffic in each virtual machine VM #1, VM #2, VM #3, and VM #4 belonging to the internal network, the external network (external net) may be configured to process Internet traffic in a manner of configuring "223.39.6.2" which is the public IP address allocated to the virtual router Virtual Router 1 as a source IP address and randomly changing a source port.

Furthermore, when an inbound packet occurs, the edge gateway device 200 associated with the external network (external net) during this Internet traffic processing procedure is configured to transfer the corresponding inbound packet to the same virtual machine having attempted the Internet traffic on the basis of the source information configured to record "223.39.6.2" corresponding to the source IP address and a random source port according to implementation of the above-described Stateful NAT.

Since a virtual machine is configured to operate as a server like a web server in the mobile-edge computing environment, most of same are inbound packets that access the virtual machine from the outside.

In this regard, an embodiment of the present disclosure provides a floating IP address-based inbound packet processing function in consideration of characteristics of the mobile-edge computing environment.

When processing for an inbound packet in each virtual machine belonging to the internal network is required, the external network according to an embodiment of the present disclosure is configured to manage mapping by allocating a public IP address of one of public IP bands to each virtual machine as a floating IP address.

In this regard, in case that an inbound packet is received, the edge gateway device 200 may be configured to convert the floating IP address configured as a destination address of the inbound packet into a private IP address of the virtual machine configured to have a mapping relationship with the address and transfer the private IP address.

Figure 6:
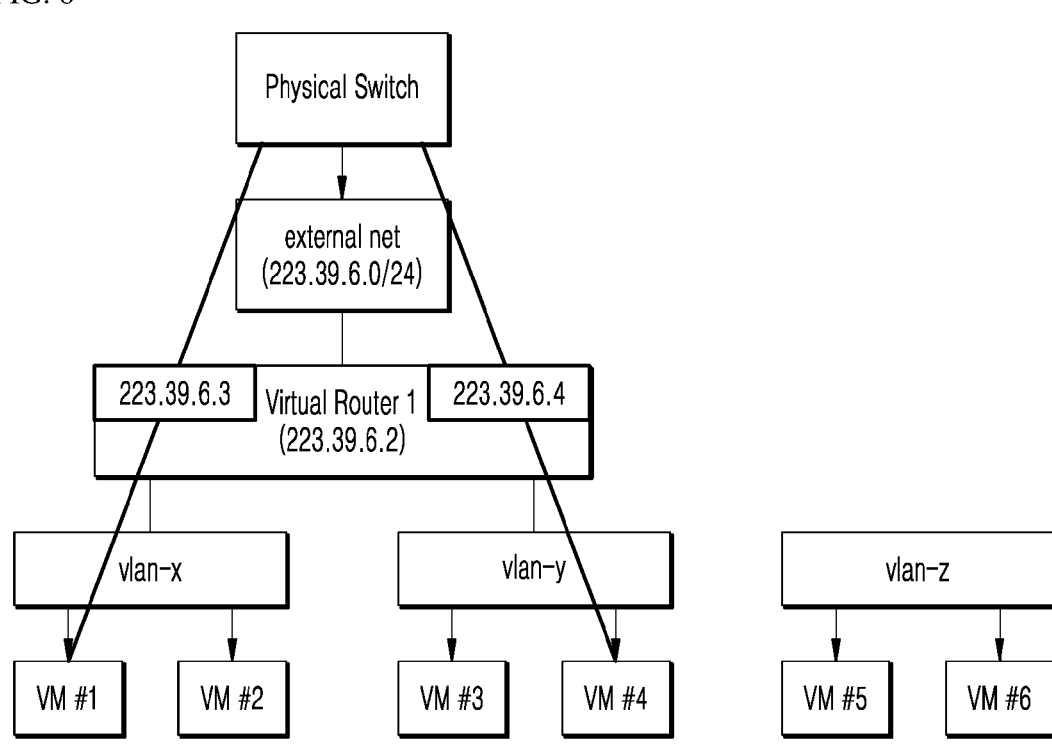
FIG. 6 is an exemplary view illustrating floating IP-based inbound packet processing according to an embodiment of the present disclosure.

For example, referring to FIG. 6, when processing for an inbound packet is required in the first virtual machine VM #1 and the third virtual machine VM #3, the external network (external net) is configured to manage mapping by allocating "223.39.6.3" corresponding one of public IP bands to the first virtual machine VM #1 as a floating IP address and "223.39.6.4" corresponding one of public IP bands to the third virtual machine VM #3 as a floating IP address.

When the inbound packet is received, during the inbound packet processing procedure, the edge gateway device 200 associated with the external network (external net) may be configured to change "223.39.6.3" or "223.39.6.4" which is the floating IP address configured as the destination IP address of the inbound packet into a private IP address of the first virtual machine VM #1 or the third virtual machine VM #3 configured to have a mapping relationship with the corresponding floating IP address and transfer the private IP address.

Of course, the floating IP address allocated to the virtual machine during the inbound packet processing procedure can be canceled with respect to the corresponding virtual machine or reallocated with a desired IP.

As described above, it may be seen that, according to the configuration of the edge platform management device 100 according to an embodiment of the present disclosure, the multi-tenancy required in the mobile-edge computing (MEC) environment may be efficiently implemented by defining the virtual router and the floating IP address object with respect to the internal network configured to support communication between virtual machines in the mobile-edge computing environment and extending the communication area of the virtual machines belonging to the internal network based thereon.

Figure 7:
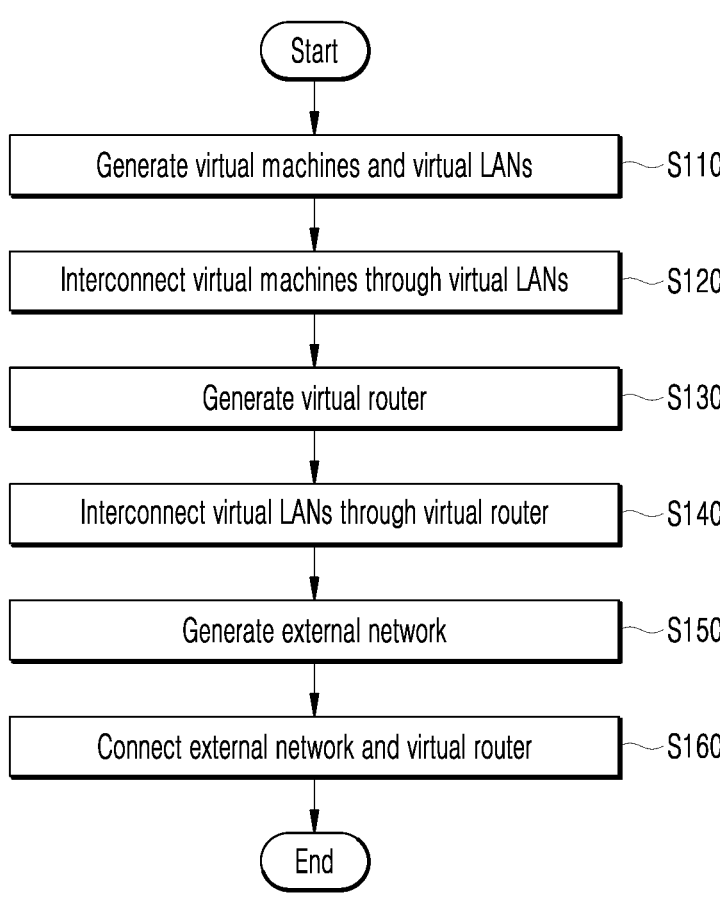
FIG. 7 is a flowchart illustrating an operation method of an edge platform management device according to an embodiment of the disclosure.

Hereinafter, an operation method of the edge platform management device 100 according to an embodiment of the present disclosure will be described with reference to FIG. 7.

First, the network generation part 110 is configured to interconnect virtual machines through a virtual LAN and generate an internal network in which communication between virtual machines connected to the virtual LAN is supported (S110-S120).

That is, as shown in FIG. 3, in case of generating a first virtual machine VM #1 to a sixth virtual machine VM #6, an internal network may be configured to be generated in a manner of generating a first virtual LAN vlan-x, a second virtual LAN vlan-y, and a third virtual LAN vlan-z for a pair of the first virtual machine VM #1 and the second virtual machine VM #2, a pair of the third virtual machine VM #3 and the fourth virtual machine VM #4, and a pair of the fifth virtual machine VM #5 and the sixth virtual machine VM #6, respectively, and using the virtual LANs to interconnect a designated pair of virtual machines.

Here, it is possible to perform communication between the first virtual machine VM #1 and the second virtual machine VM #2 connected through the first virtual LAN vlan-x, communication between the third virtual machine VM #3 and the fourth virtual machine VM #4 connected through the second virtual LAN vlan-y, and communication between the fifth virtual machine VM #5 and the sixth virtual machine VM #6 connected through the first virtual LAN vlan-x.

Meanwhile, since the third virtual LAN vlan-z is not connected to the virtual router Virtual Router 1, in case of the fifth virtual machine VM #5 and the sixth virtual machine VM #6, it may be seen that communication with other internal networks remains impossible.

Thereafter, when an internal network is generated, the network management part 120 is configured to interconnect, through a virtual router, virtual LANs constituting the internal network and extend a communication area of virtual machines so that communication between internal networks connected through the virtual router is supported (S130-S140).

That is, as shown in FIG. 4, in case that supporting for communication between the internal network including the first virtual LAN vlan-x and the internal network including the second virtual LAN vlan-y is required, a communication area of virtual machines VM #1, #2, #3, and #4 may be configured to be extended to support communication between internal networks connected through the virtual router Virtual Router 1 by connecting the first virtual LAN vlan-x and the second virtual LAN vlan-y through the virtual router Virtual Router 1.

In this case, communication between the first virtual machine VM #1 and the third virtual machine VM #3 or the fourth virtual machine VM #4, and communication between the second virtual machine VM #2 and the third virtual machine VM #3 or the fourth virtual machine VM #4 become possible.

Meanwhile, since the third virtual LAN vlan-z is not connected to the virtual router Virtual Router 1, in case of the fifth virtual machine VM #5 and the sixth virtual machine VM #6, it may be seen that communication with other internal networks remains impossible.

Thereafter, when support for communication between internal networks is completed, the network management part 120 is configured to connect an external network configured to support switch (physical switch)-based routing to a virtual router to extend a communication area of virtual machines so that Internet connection is supported through connection of the external network and the edge gateway device 200 (S150-S160).

Here, the network management part 120 is configured to generate the external network to have a public IP subnet and the virtual router connected to the external network may be allocated with a public IP address of one of public IP bands belonging to the external network to process Internet traffic.

That is, as shown in FIG. 5 described above, in case that the external network (external net) has a public IP band of 223.39.6.0/24, it is possible that the virtual router Virtual Router 1 connected to the external network (external net) is allocated with 223.39.6.2, which is one of public IP bands belonging to the external network (external net).

As such, the public IP address allocated to the virtual router when connected to the external network is to be used for Stateful NAT.

Figure 8:
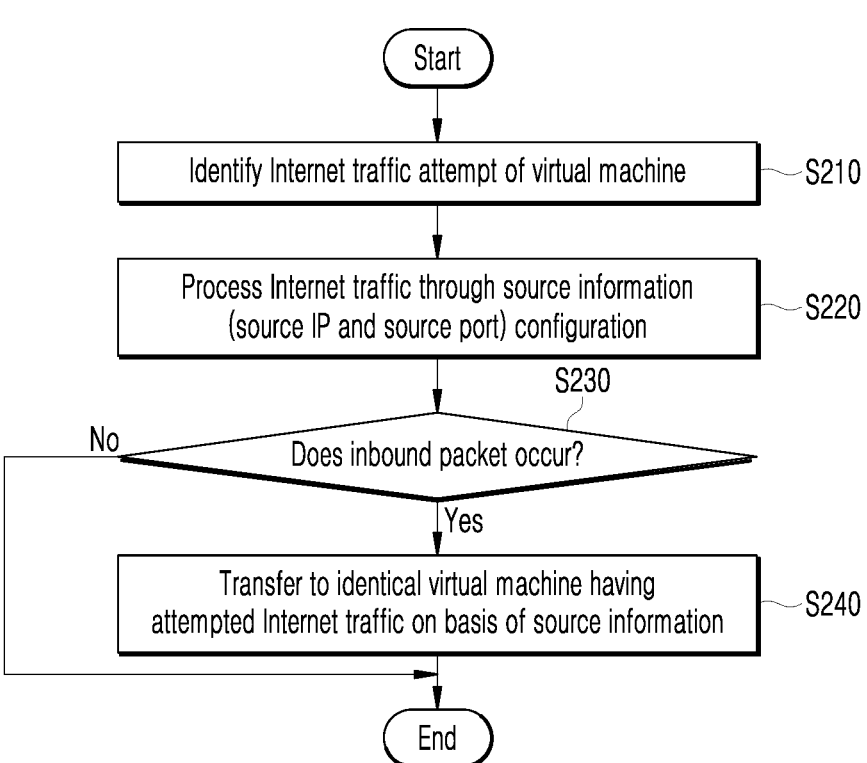
FIG. 8 is a flowchart illustrating an Internet traffic processing operation according to an embodiment of the disclosure.

In this regard, referring to FIG. 8, an Internet traffic processing operation according to an embodiment of the disclosure may be described as follow.

First, when attempting Internet traffic in each virtual machine belonging to the internal network, the external network is configured to process Internet traffic by configuring the public IP address allocated to the virtual router as a source IP address and randomly changing a source port (S210-S220).

That is, referring to above-described FIG. 5 again, when attempting Internet traffic in each virtual machine VM #1, VM #2, VM #3, and VM #4 belonging to the internal network, the external network (external net) may be configured to process Internet traffic in a manner of configuring "223.39.6.2" which is the public IP address allocated to the virtual router Virtual Router 1 as a source IP address and randomly changing a source port.

Furthermore, with reference to the source information, the edge gateway device 200 is configured to transfer an inbound packet generated during the Internet traffic processing procedure to the same virtual machine having attempted the Internet traffic (S230-S240).

In other words, when an inbound packet occurs, the edge gateway device 200 associated with the external network (external net) during this Internet traffic processing procedure is configured to transfer the corresponding inbound packet to the same virtual machine having attempted the Internet traffic on the basis of the source information configured to record "223.39.6.2" corresponding to the source IP address and a random source port according to implementation of the above-described Stateful NAT.

Since a virtual machine is configured to operate as a server like a web server in the mobile-edge computing environment, most of same are inbound packets that access the virtual machine from the outside.

In this regard, an embodiment of the present disclosure provides a floating IP address-based inbound packet processing function in consideration of characteristics of the mobile-edge computing environment.

Figure 9:
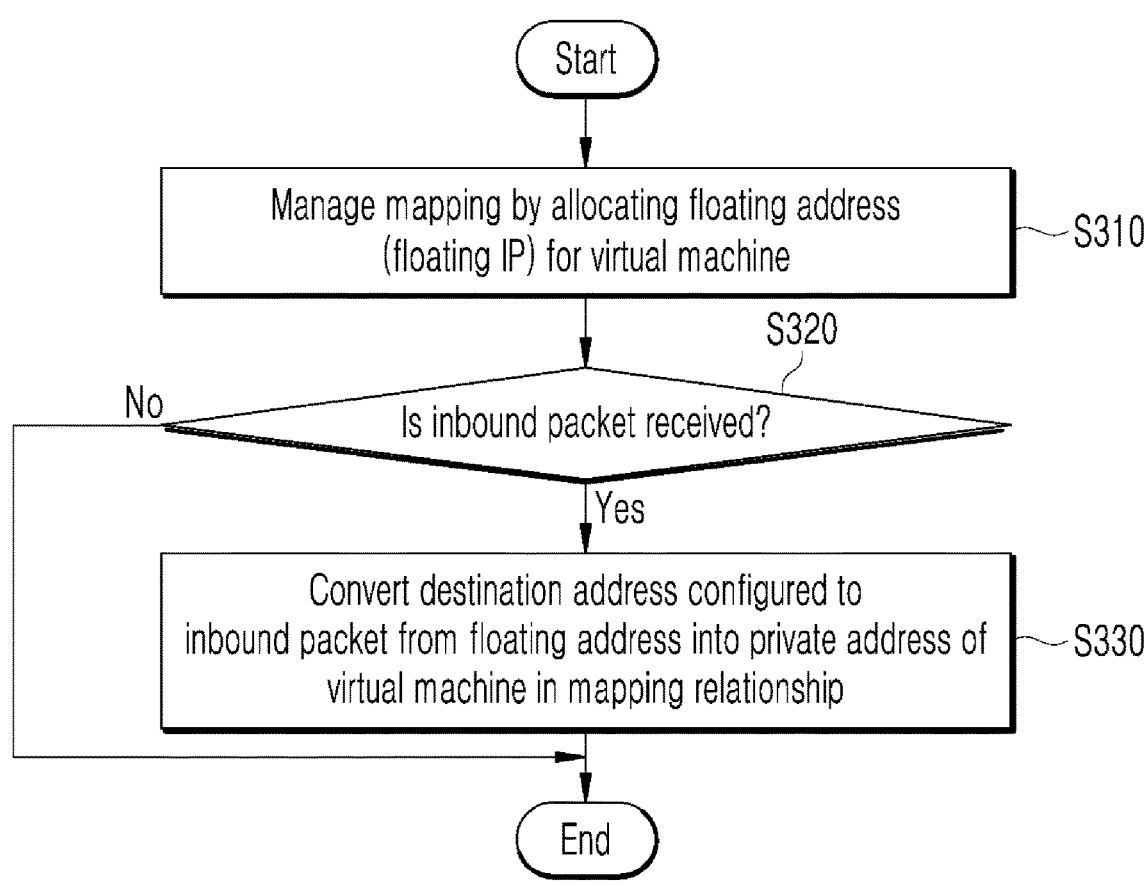
FIG. 9 is a flowchart illustrating an inbound traffic processing operation according to an embodiment of the disclosure.

In this regard, referring to FIG. 9, an inbound packet processing operation according to an embodiment of the disclosure may be described as follow.

When processing for an inbound packet in each virtual machine belonging to the internal network is required, the external network is configured to manage mapping by allocating a public IP address of one of public IP bands to each virtual machine as a floating IP address.

That is, referring to FIG. 6 described above, when processing for an inbound packet is required in the first virtual machine VM #1 and the third virtual machine VM #3, the external network (external net) is configured to manage mapping by allocating "223.39.6.3" corresponding one of public IP bands to the first virtual machine VM #1 as a floating IP address and "223.39.6.4" corresponding one of public IP bands to the third virtual machine VM #3 as a floating IP address.

Of course, the floating IP address allocated to the virtual machine during the inbound packet processing procedure can be canceled with respect to the corresponding virtual machine or reallocated with a desired IP.

Furthermore, in case that an inbound packet is received, the edge gateway device 200 may be configured to convert the floating IP address configured as a destination address of the inbound packet into a private IP address of the virtual machine configured to have a mapping relationship with the address and transfer the private IP address (S320-S330).

That is, when the inbound packet is received, during the inbound packet processing procedure, the edge gateway device 200 associated with the external network (external net) may be configured to change "223.39.6.3" or "223.39.6.4" which is the floating IP address configured as the destination IP address of the inbound packet into a private IP address of the first virtual machine VM #1 or the third virtual machine VM #3 configured to have a mapping relationship with the corresponding floating IP address and transfer the private IP address.

As described above, it may be seen that, according to the operation method of the edge platform management device 100 according to an embodiment of the present disclosure, the multi-tenancy required in the mobile-edge computing (MEC) environment may be efficiently implemented by defining the virtual router and the floating IP address object with respect to the internal network configured to support communication between virtual machines in the mobile-edge computing environment and extending the communication area of the virtual machines belonging to the internal network based thereon.

The operation method of the edge platform management device 100 according to an embodiment of the present disclosure may be implemented in a form of program command that may be configured to be executed through various computer means and recorded on a computer readable medium. The computer readable medium may include program commands, data files, data structures, etc. alone or in combination. Program commands recorded on the medium may be specially designed and configured for the present disclosure or known and usable to those skilled in computer software. Examples of computer-readable recording media include magnetic media such as hard disks, floppy disks, and magnetic tapes, optical media such as CD-ROMs and DVDs, magneto-optical media such as floptical disks, and hardware devices specially configured to store and execute program commands, such as ROM, RAM, flash memory, and the like. Examples of program commands include high-level language codes that may be executed by a computer using an interpreter, as well as machine language codes produced by a compiler. The aforementioned hardware device may be configured to function as one or more software modules to perform the operations of the present disclosure, and vice versa.

Although the present disclosure has been described in detail with reference to preferred embodiments, the present disclosure is not limited to the above-described embodiments, and the technical idea of the present disclosure extends to the extent that any person with ordinary knowledge in the technical field to which the present disclosure belongs may make various changes or modifications without departing from the gist of the present disclosure claimed in the following claims.

The invention claimed is:

1. An edge platform management device comprising:
a network generation part configured to interconnect virtual machines through a virtual LAN for generating an internal network in which communication between the virtual machines connected to the virtual LAN is supported; and
a network management part configured to interconnect virtual LANs constituting the internal networks through a virtual router to support communication between internal networks connected through the virtual router, thereby extending a communication area of virtual machines,
wherein the network management part is configured to interconnect an external network for supporting a switch (physical switch)-based routing to the virtual router to support Internet connection through the external network and an edge gateway device, thereby extending a communication area of virtual machines,
wherein the external network is configured to, when processing for an inbound packet in each virtual machine belonging to the internal network is required, allocate a public IP address of a public IP band to the virtual machine as a floating IP address, and
wherein the edge gateway device is configured to, when the inbound packet is received, change the floating IP address set as a destination IP of the inbound packet to a private IP address of the virtual machine according to a mapping relationship between the floating IP address and the private IP address.

2. The edge platform management device of claim 1, wherein
the external network is configured to be generated to have a public IP subnet, and
the virtual router is configured to be allocated with the public IP address of the public IP band belonging to the external network to process Internet traffic according to a connection with the external network.

3. The edge platform management device of claim 2, wherein the external network is configured to, when each virtual machine belonging to the internal network attempts Internet traffic, process the Internet traffic by setting the public IP address allocated to the virtual router as a source IP address and randomly changing a source port, and
the edge gateway device is configured to, when an inbound packet occurs during the Internet traffic processing procedure, transfer the inbound packet to the virtual machine having attempted the Internet traffic according to source information including the source IP address and the source port.

4. An edge gateway device configured to transfer an inbound packet by using an external network connected to a virtual router in relation to an edge platform configuring internal network in which virtual machines are connected through a virtual LAN and connecting virtual LANs of internal networks through the virtual router,
wherein the external network is configured to be generated to have a public IP subnet, and the virtual router is configured to be allocated with a public IP address of one of public IP bands belonging to the external network to process Internet traffic according to connection with the external network,
wherein the external network is configured to, when processing for an inbound packet in each virtual machine belonging to the internal networks is required, allocate a public IP address of public IP band to the virtual machine as a floating IP address, and
wherein the edge gateway device is configured to, when the inbound packet is received, change the floating IP address set as a destination IP of the inbound packet to a private IP address of the virtual machine according to mapping relationship between the floating IP address and the private IP address.

5. The edge gateway device of claim 4, wherein
the external network is configured to, when each virtual machine belonging to the internal network attempts Internet traffic, process the Internet traffic by setting a public IP address allocated to the virtual router as a source IP address and randomly changing a source port, and
the edge gateway device is configured to, when an inbound packet occurs during the Internet traffic processing procedure, transfer the inbound packet to the virtual machine having attempted the Internet traffic according to source information including the source IP address and the source port.

6. An operation method of an edge platform management device, the operation method comprising:

interconnecting virtual machines through a virtual LAN for generating an internal network in which communication between the virtual machines connected to the virtual LAN is supported; and interconnecting virtual LANs constituting internal networks through a virtual router to support communication between internal networks connected through the virtual router, thereby extending a communication area of virtual machines, wherein the interconnecting of the virtual LANs further comprises interconnecting an external network for supporting a switch (physical switch)-based routing to the virtual router to support Internet connection through the external network and an edge gateway device, thereby extending a communication area of virtual machines, wherein the external network is configured to be generated to have a public IP subnet, and the virtual router is configured to be allocated with a public IP address of the public IP band belonging to the external network to process Internet traffic according to connection with the external network wherein the external network is configured to, when processing for an inbound packet in each virtual machine belonging to the internal network is required, allocate a public IP address of public IP band to the virtual machine as a floating IP address, and wherein the edge gateway device is configured to, when the inbound packet is received, change the floating IP address set as a destination IP of the inbound packet to a private IP address of the virtual machine according to a mapping relationship between the floating IP address and the private IP address.

7. The operation method of claim 6, wherein the external network is configured to, when each virtual machine belonging to the internal network attempts Internet traffic, process the Internet traffic by setting the public IP address allocated to the virtual router as a source IP address and randomly changing a source port, and the edge gateway device is configured to, when an inbound packet occurs during the Internet traffic processing procedure, transfer the inbound packet to the virtual machine having attempted the Internet traffic according to source information including the source IP address and the source port.

8. A non-transitory storage medium that stores instructions which, when executed by a processor, cause the processor to execute each operation of claim 6.

* * * * *